UNITED STATES PATENT OFFICE.

ISAAC COLEMAN, OF NEW YORK, N. Y.

IMPROVEMENT IN THE MANUFACTURE OF ARTIFICIAL STONE.

Specification forming part of Letters Patent No. 120,369, dated October 31, 1871.

*To all whom it may concern:*

Be it known that I, ISAAC COLEMAN, of the city of New York, in the county and State of New York, have invented a new and Improved Compound for the Manufacture of Artificial Stone, of which the following is a specification:

The object of my invention is to provide a composition which will make an artificial stone that is harder and more impervious to water than any other hitherto known or used, and which will set or harden quickly and simultaneously; the stone thus produced being well adapted for buildings, pavements, and masonry placed under water, as well as for other purposes.

The formula for my improved composition is as follows: One part of fat-lime; two parts of Portland cement; nine parts of clean sharp sand or gravel; one pound of rock-alum dissolved in ten gallons of common water. I first carefully and thoroughly mix the Portland cement, and then sand, while dry; I then reduce the fat-lime to a consistency about equal to that of milk, with the solution of alum. The whole of the ingredients are then thoroughly mixed and moistened with the alum solution, the quantity of the solution employed being governed by the purpose for which the stone is to be used—as, for instance, whether it is to be molded into building-blocks or otherwise.

The solution of alum causes the lime and cement to set or harden simultaneously and more quickly and imparts a greater degree of hardness to the stone, besides rendering it more capable of resisting the action of water than are any of the artificial stones hitherto known or used.

The composition after being thoroughly mixed and moistened with the solution of alum as above described is pressed in any suitable manner, either by direct and continuous pressure or by tamping, the amount of pressure being varied according to the purpose for which the stone is designed to be used.

I may state that my invention is well adapted for lining cisterns and reservoirs, and that when employed for this purpose it requires a larger quantity of the solution of alum than when molded into building-blocks.

Having thus described my invention, what I claim, and desire to secure by Letters Patent of the United States, is—

The composition for the manufacture of artificial stone, substantially as herein described and set forth.

ISAAC COLEMAN.

Witnesses:
 JOHN S. THORNTON,
 R. BRINKERHOFF.

(153)